NOISE LIMITER FOR TELEVISION RECEIVERS
Filed Aug. 24, 1951
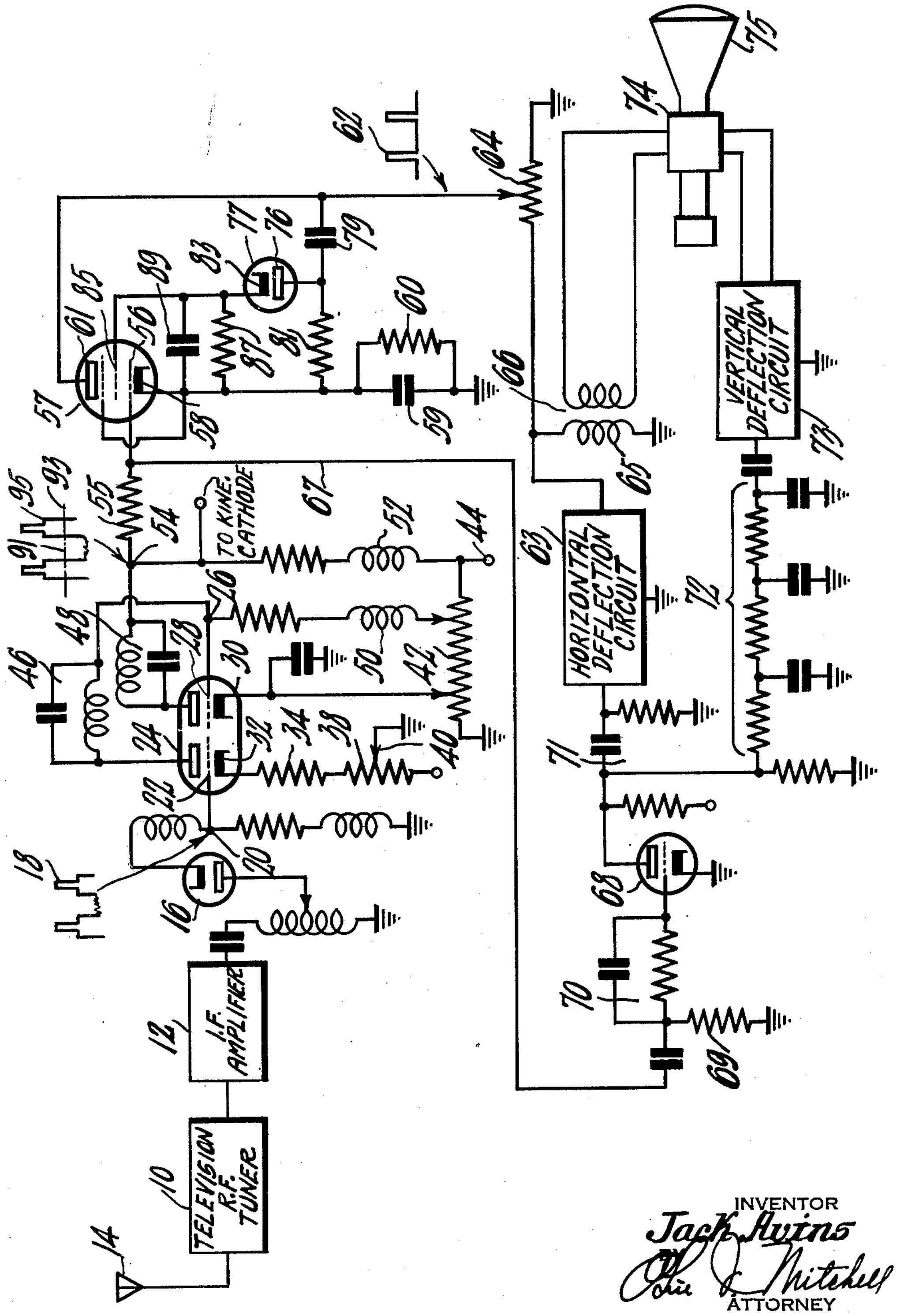
INVENTOR
Jack Avins
BY
Ollie J. Mitchell
ATTORNEY Patented June 22, 1954 2,681,948

UNITED STATES PATENT OFFICE 2,681,948

NOISE LIMITER FOR TELEVISION RECEIVERS

Jack Avins, Staten Island, N. Y., assignor to Radio Corporation of America, a corporation of Delaware Application August 24, 1951, Serial No. 243,453

3 Claims. (Cl. 178—7.3)

The present invention relates to improvements in signal processing circuits and more particularly, although not necessarily exclusively, to signal processing circuits designed to permit the passage only of those applied signals having amplitudes falling below a predetermined amplitude level, without adversely affecting the waveform of the signals so passed.

In one of its aspects this invention relates to noise immunity in the synchronizing circuits of television receivers.

One successful method of improving the noise immunity of television receivers is to pass the received demodulated television signal through a clipping stage which clips all signals in excess of a value defined by a control voltage. This control voltage is made a function of the amplitude reached by the recurrent peaks of sync signal which represent maximum carrier amplitude. This control voltage itself can be obtained by rectifying the demodulated video signal so that a capacitive load in the rectifier circuit will develop an average voltage representing the peaks of sync. An improved method and apparatus for obtaining this control voltage has been disclosed in my copending United States patent application, Serial Number 200,904, filed December 15, 1950.

In the circuit disclosed in my copending application referred to immediately above, the output of a video amplifier is fed to the control grid of a triode connected as a cathode follower. Positive keying pulses synchronous with the sync peaks of the video signal are applied to the plate of the triode. A large capacitor is placed in the cathode circuit of the triode so that a control voltage is obtained across that capacitor, which control voltage represents peaks of sync. Clipping means are provided to clip noise above that control voltage.

It is an object of this invention to improve the noise immunity of television receivers.

It is another object of this invention to further improve the noise immunity of television receivers without adversely affecting the operation of the keyed noise clipper by providing a circuit that will prevent keying pulses from being fed into the receiver's synchronizing signal separator when using a keyed noise clipper.

According to the present invention a tube having a screen grid is used as a keyed noise clipper. Its screen grid potential is maintained constant with respect to the potential of its cathode and is obtained by rectifying keying pulses. Means are provided to prevent the screen current from flowing into the tube's cathode circuit, so that only the keyed plate current contributes to the maintenance of the cathode voltage at the sync peak level. This cathode voltage can then be used in clipping noise. No keying pulse is present between the screen grid and the control grid of the tube, so that no keying pulse can be fed into the synchronizing signal separator circuit.

Other and incidental objects of the present invention will be apparent to those skilled in the art from a reading of the following specification and an inspection of the accompanying drawing which shows, by block diagram and schematic representation, a television receiver employing an embodiment of the invention.

Referring now to the drawing there is shown at 10 a television RF tuner followed by an intermediate frequency amplifier 12. The television RF tuner receives signals from the antenna 14 which are processed in the usual manner by the tuner and the intermediate frequency amplifier and finally demodulated by the diode 16. The demodulated video signal 18 then appears at the terminal 20 of the diode load. The terminal 20 is connected with the grid 22 of the first video amplifier 24 whose output at terminal 26 is D. C. coupled to the grid 28 of the second video amplifier 30. The cathode 32 of the first video amplifier 24 is connected through resistance 34 to the contrast control potentiometer 38 whose variable tap 40 is grounded.

Proper operating voltage for the D. C. coupled amplifiers 24 and 30 are provided by suitable connections to the bleeder 42 connected from power supply terminal 44 to ground. The reactive circuits 46 and 48, as well as inductances 50 and 52, provide well-known frequency compensation in the video amplifiers. The output terminal 54 of the second video amplifier 30 is connected through a resistor 55 to the control grid 56 of an electron discharge tube 57. Tube 57 is connected as a cathode follower type amplifier and is shown as a pentode. The cathode 58 of tube 57 is connected to ground through a capacitor 59 and a resistor 60 connected in parallel. The anode 61 of tube 57 is connected to a source of positive keying pulses of the type shown at 62.

The pulses 62 should be synchronous with the sync pulses of the incoming television signal, and may be conveniently derived from the fly back pulses produced in the horizontal deflection circuit 63. In the drawing this is accomplished by means of a tap resistance or potentiometer 64 connected in shunt with the primary 65 of the deflection output transformer 66. The pulses 62 are of sufficient amplitude to cause the tube 57 to be driven into conduction during the interval of the keying pulses.

The control grid 56 of tube 57 is connected by means of lead 67 to the input of any conventional sync separator circuit such as, for example, electron discharge tube 68 with its associated time constant networks 69 and 70. Horizontal sync information is applied through differentiating network 71 to the input of the horizontal deflection circuit 63 while vertical synchronizing information is applied through the integrating network 72 to the input of the vertical deflection circuit 73. The outputs of both the horizontal and vertical deflection circuits are connected to the deflection yoke 74 associated with the kinescope 75.

According to the illustrated embodiment of the present invention the anode 76 of a rectifier 77 is connected to the source of positive pulses 64 through a capacitor 79 and to the cathode 58 of tube 57 through a resistor 81. The cathode 83 of rectifier 77 is connected to the screen grid 85 of tube 57, and to the cathode 58 of tube 57 through a resistor 87 and a capacitor 89 connected in parallel.

The operation of the circuit is as follows: The composite television signal 91 appearing at the output terminal 54 of the second video amplifier 30 will have an A. C. axis such as 93 whose distance from the level of blanking 95 represents the average brightness of the scene being transmitted. This means that the average D. C. potential of the output terminal 54 will vary with respect to ground or to a point of fixed potential in accordance with the average brightness of the scene transmitted. Furthermore, in the particular arrangement shown in the drawing, since there is a direct current coupling from the output of the diode 16 to the output terminal 54, the average D. C. potential of the terminal 54 with respect to ground will also vary in accordance with received signal strength.

The waveform 91 is applied to the grid 56 of the keyed amplifier 57 through resistor 55. Since the amplifier 57 is keyed "on" only during the positive excursions of the keying pulses 62 (which are in turn synchronous with the sync pulses of the signal 91) the voltage across the capacitor 59 will always be representative of peaks of sync. This is in accordance with the well known cathode follower action.

Noise clipping means are provided by the control electrode 56 and cathode 58 of tube 57. The potential at the cathode 58 will always represent peaks of sync. The potential on the control electrode 56 will be more positive than the potential at the cathode 58 only when noise tends to create peaks, at control electrode 56, which are in excess of peaks of sync. On noise peaks the control electrode-cathode space of tube 57 will conduct, and its conduction current will produce a heavy voltage drop across resistor 55 so as to produce a very effective clipping action. It is noted that a separate rectifier can be used for this clipping action. Since the output terminal 54 is connected to the input of the amplifier tube 57 no energy is required from the second video amplifier to charge the capacitor 59. This charging energy comes solely from the deflection circuit by means of the keying pulses 62. Since the storage capacitor 59 is in the cathode circuit of the amplifier 57, the capacitor 59 may be made quite large due to the low charging impedance it sees. Hence noise clipped by the control electrode-cathode space of amplifier 57 will not tend to vary the reference potential or control potential developed across capacitor 59.

In accordance with the present invention keying pulses 62 are rectified by the diode 77 to produce a unidirectional positive potential on the screen grid 85 of tube 57. This potential is held constant with respect to the cathode 58 of tube 57 by means of storage capacitor 89. It is seen that screen current cannot flow through the cathode resistor 60 as no return path is provided for it, due to the presence of condenser 79; screen current flows through diode 77 and resistors 81 and 87. As the screen current does not flow through the cathode resistor 60, only the keyed plate current contributes to the maintenance of the potential of cathode 58 of tube 57 at the sync peak level, so that this level can be used in clipping noise extending above the sync peak level.

The circuit of the present invention has the advantage that no keying pulse is fed into the sync circuits as there is no keying pulse between the screen grid 85 and the control grid 56 of tube 57.

Having described the invention, I claim:

1. In a television receiver adapted to receive television signals having a recurrent synchronizing pulse component and comprising a video amplifier having an output terminal, a keyed noise clipper comprising: an electron tube having an anode, a cathode, means connected with said electron tube for rendering said tube normally non-conducting, a control electrode and a screen grid, a point of reference potential, a capacitor connected between the cathode of said electron tube and said point of reference potential, a resistor connected in shunt with said capacitor, means connecting the output terminal of said video amplifier to the control electrode of said electron tube, a source of keying pulses synchronous with the recurrent pulse component of the television signals, means connecting the anode of said electron tube to said source of keying pulses such to render said tube conductive during each keying pulse, and rectifier means connecting the screen grid of said electron tube to said source of keying pulses, said rectifier including voltage storage means sufficient to maintain a unilateral potential on said screen grid during intervals between said keying pulses.

2. In a television receiver adapted to receive television signals having a recurrent synchronizing pulse component and comprising a video amplifier having an output terminal, a keyed noise clipper comprising: an electron tube having an anode, a cathode, a control electrode and a screen grid, means connected with said electron tube for rendering said tube normally non-conducting, a point of reference potential, a capacitor connected between the cathode of said normally non-conducting electron tube and said point of reference potential, a resistor connected in shunt with said capacitor, means connecting the output terminal of said video amplifier to the control electrode of said normally non-conducting electron tube, a source of keying pulses synchronous with the recurrent pulse component of the television signals, means connecting the anode of said normally non-conducting electron tube to said source of keying pulses to render conducting said normally non-conducting electron tube during the occurrence of said keying pulses, and rectifier means connecting the screen grid of said electron tube to said source of keying pulses, said rectifier including voltage storage means sufficient to maintain a unilateral potential on said screen grid during intervals between said keying pulses.

3. In a television receiver adapted to receive television signals having a recurrent synchronizing pulse component and comprising a video amplifier having an output terminal, a keyed noise clipper comprising: an electron tube having an anode, a cathode, a control electrode and a screen grid, means connected with said electron tube for rendering said tube normally non-conducting, a point of reference potential, a capacitor connected between the cathode of said electron tube and said point of reference potential, a resistor connected in shunt with said capacitor, means connecting the output terminal of said video amplifier to the control electrode of said electron tube, a source of keying pulses synchronous with the recurrent pulse component of the television signals, means connecting the anode of said electron tube to said source of keying pulses so as to render said normally non-conducting electron tube conducting during said keying pulses, a unilateral conduction device having an anode and a cathode, a capacitor connected between said source of keying pulses and the anode of said unilateral conduction device, a connection between the screen grid of said electron tube and the cathode of said unilateral conduction device, a first resistor connected between the anode of said unilateral conduction device and the cathode of said electron tube, a second resistor connected between the cathode of said unilateral conduction device and the cathode of said electron tube, and a capacitor connected in shunt with said second resistor.

References Cited in the file of this patent

UNITED STATES PATENTS

| Number | Name | Date |
|---|---|---|
| 2,293,528 | Barco et al. | Aug. 18, 1942 |
| 2,593,011 | Cotsworth | Apr. 11, 1952 |

FOREIGN PATENTS

| Number | Country | Date |
|---|---|---|
| 845,897 | France | Sept. 4, 1939 |